United States Patent [19]

Shichinohe et al.

[11] Patent Number: 4,574,652

[45] Date of Patent: Mar. 11, 1986

[54] TRANSMISSION FOR USE IN MOTOR VEHICLES

[75] Inventors: Takashi Shichinohe, Tokyo; Masahiro Imaizumi; Ryoichi Ikejima, both of Saitama; Yoshio Oka, Saitama, all of Japan

[73] Assignee: Honda Giken Kogyo Kabushiki Kaisha, Tokyo, Japan

[21] Appl. No.: 639,283

[22] Filed: Aug. 9, 1984

[30] Foreign Application Priority Data

Aug. 8, 1983 [JP] Japan .................. 58-143635

[51] Int. Cl.$^4$ .............................................. G05G 5/06
[52] U.S. Cl. .................................... 74/474; 74/337.5; 74/475; 180/215; 180/230
[58] Field of Search ............... 180/230, 215; 74/337.5, 74/474, 360, 359, 538, 473 R, 475, 477

[56] References Cited

U.S. PATENT DOCUMENTS

| 4,320,670 | 3/1982 | Kawamoto | 74/477 |
| 4,337,673 | 7/1982 | Kawamoto | 74/475 |
| 4,372,416 | 2/1983 | Igarashi | 180/215 |
| 4,391,158 | 7/1983 | Malott | 74/337.5 |
| 4,491,031 | 1/1985 | Ooka | 74/337.5 |

FOREIGN PATENT DOCUMENTS

| 22718 | 12/1917 | Denmark | 74/474 |
| 1780376 | 5/1972 | Fed. Rep. of Germany | 180/230 |

Primary Examiner—Joseph F. Peters, Jr.
Assistant Examiner—Everett G. Diederiks, Jr.
Attorney, Agent, or Firm—Armstrong, Nikaido, Marmelstein & Kubovcik

[57] ABSTRACT

An improved transmission in a motor vehicle including a body, an engine located in the vicinity of the center of the body, a pair of footrests attached to the body near the engine, and front and rear wheels. The transmission is integral with the engine and has a casing, a shift spindle having one end projecting from the casing and rotatable for shifting the transmission, and a control lever coupled to the shift spindle. According to the improvement, a cam means is interposed between the control lever and the casing for limiting shifting operation of the control lever. The cam means comprises a cam member having a cam surface and fixed to the casing, a shaft member axially slidably fitted in the control lever and having a control knob on a first end thereof, and a spring disposed between the shaft member and the control lever for urging the shaft member to cause a second end of the shaft member to abut against the cam surface of the cam member. The cam means makes gear shifting operation more reliable and convenient.

6 Claims, 4 Drawing Figures

TRANSMISSION FOR USE IN MOTOR VEHICLES

BACKGROUND OF THE INVENTION

1. Field of the Invention

The present invention relates to a transmission for use in a motor vehicle, and more particularly to a transmission integral with an engine in a motor vehicle.

2. Description of the Prior Art

There are known motor vehicles having an engine located in the vicinity of the center of a vehicle body, a pair of footrests attached to the vehicle body near the engine, front and rear wheels, and a transmission integral with the engine. Some of such motor vehicles are three-wheeled motor vehicles, and some are four-wheeled motor vehicles. In some instances these motor vehicles have a shift spindle projecting from a transmission casing and rotatable for actuating the transmission, and a control lever coupled to the shift spindle, and in such instances transmission control operation can be facilitated by providing a mechanism for suitably limiting the operation of the control lever.

SUMMARY OF THE INVENTION

It is an object of the present invention to provide a transmission having a mechanism of a most favorable construction for limiting the operation of a control lever.

According to the present invention, a transmission is employed in a motor vehicle including a body, an engine located in the vicinity of the center of the body, a pair of footrests attached to the body near the engine, and front and rear wheels. The transmission is integral with the engine and has a casing, a shift spindle having one end projecting from the casing and rotatable for shifting the transmission, and a control lever coupled to the shift spindle. The present invention relates to an improvement in the control lever which holds the control lever in a gear position without fail during a time that it tends to be subjected to an accidental undue force when the motor vehicle runs on relatively hard off-road terrain. According to the improvement, a cam mechanism is interposed between the control lever and the casing for limiting shifting operation of the control lever. The cam mechanism comprises a cam member fixed to the casing and having a cam surface, a shaft member axially slidably fitted in the control lever and having a control knob on a first end thereof, and a spring disposed between the shaft member and the control lever for urging the shaft member to cause a second end of the shaft member to abut against the cam surface of the cam member.

The above and further objects, details and advantages of the present invention will become apparent from the following detailed description of a preferred embodiment thereof, when read in conjunction with the accompanying drawings.

DESCRIPTION OF THE PREFERRED EMBODIMENT

Figure 1:
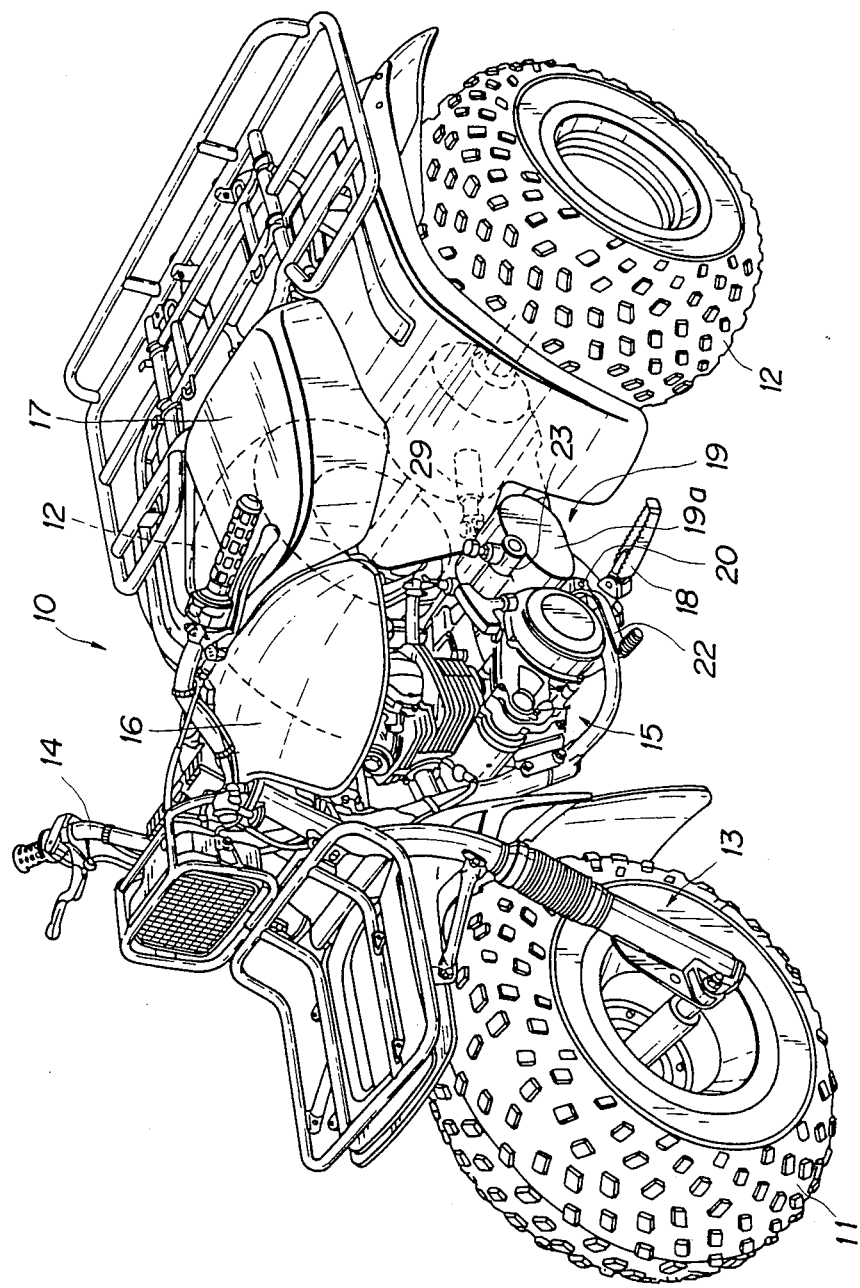
FIG. 1 is a perspective view of a motor vehicle having a transmission according to a preferred embodiment of the present invention.

FIG. 1 illustrates a motor vehicle incorporating a transmission according to a preferred embodiment of the present invention. The motor vehicle is shown as an off-road three-wheeled motorcycle having a body 10, a single front wheel 11, and a pair of rear wheels 12. The front wheel 11 is mounted by a front fork 13 on the body 10 and can be steered by a handlebar 14. An engine 15 is mounted on the body 10 in a relatively low position near the center of the body 10. On the body 10, there are also mounted a fuel tank 16 above the engine 15 and a driver's seat 17 behind the fuel tank 16. A pair of laterally spaced footrests 18 are attached to the body 10 in the vicinity of the engine 15. A transmission 19 is integrally formed with the engine 15. A first spindle 20 and a second spindle 21 (FIG. 3) project laterally from a casing 19a of the transmission 19. The first shift spindle 20 has a first control lever 22 operable by the driver's foot, and can be operated to cause a gear change by rotation of the first control lever 22. The second shift spindle 21 has a second control lever 23 operable by the driver's hand, and can be by rotation a gear change in response to of the second control lever 23 by the driver.

The improvement in the transmission according to the present invention concerns the second control lever 23. Although the transmission shown in FIG. 1 has two shift spindles with respective control levers, the improvement of the present invention is also applicable to transmissions having one shift spindle or more than two shift spindles. Thus, the number of shift spindle or spindles is not critical for the present invention.

A power unit comprising the engine 15 and the transmission 19 will be described in detail with reference to FIG. 2.

The transmission 19 comprises a primary transmission mechanism 24 and a secondary transmission mechanism 25. Each of the transmission mechanisms has a main shaft, a counter shaft, and trains of gears selectively operable for transmitting power from the main shaft to the counter shaft.

Power from the engine 15 is transmitted through a centrifugal clutch 26 and a manually operated clutch 27 to a main shaft 24a of the primary transmission mechanism 24. As shown, a single common shaft 28 doubles as a counter shaft in the primary transmission mechanism 24 and a main shaft in the secondary transmission mechanism 25. The common shaft 28 serves to transmit power from the primary transmission mechanism 24 to the secondary transmission mechanism 25. A counter shaft 25a in the secondary transmission mechanism 25 rotates a propeller shaft 29 (FIG. 1) through bevel gears so as to drive the rear wheels 12.

Each of the transmission mechanisms has a shifting mechanism composed of a shift drum rotatable by the shift spindle and having cam grooves defined in an outer peripheral surface and shift forks engaging in the cam grooves for causing one of the gear trains to transmit the power in response to rotation of the shift drum. Since the shifting mechanism is of the type generally used and known in the art, it is omitted from illustration in FIG. 2. However, FIG. 3 illustrates such a shifting mechanism for the secondary transmission mechanism, the shift drum and the shift forks being designated at 30 and 31, respectively.

Figure 2:
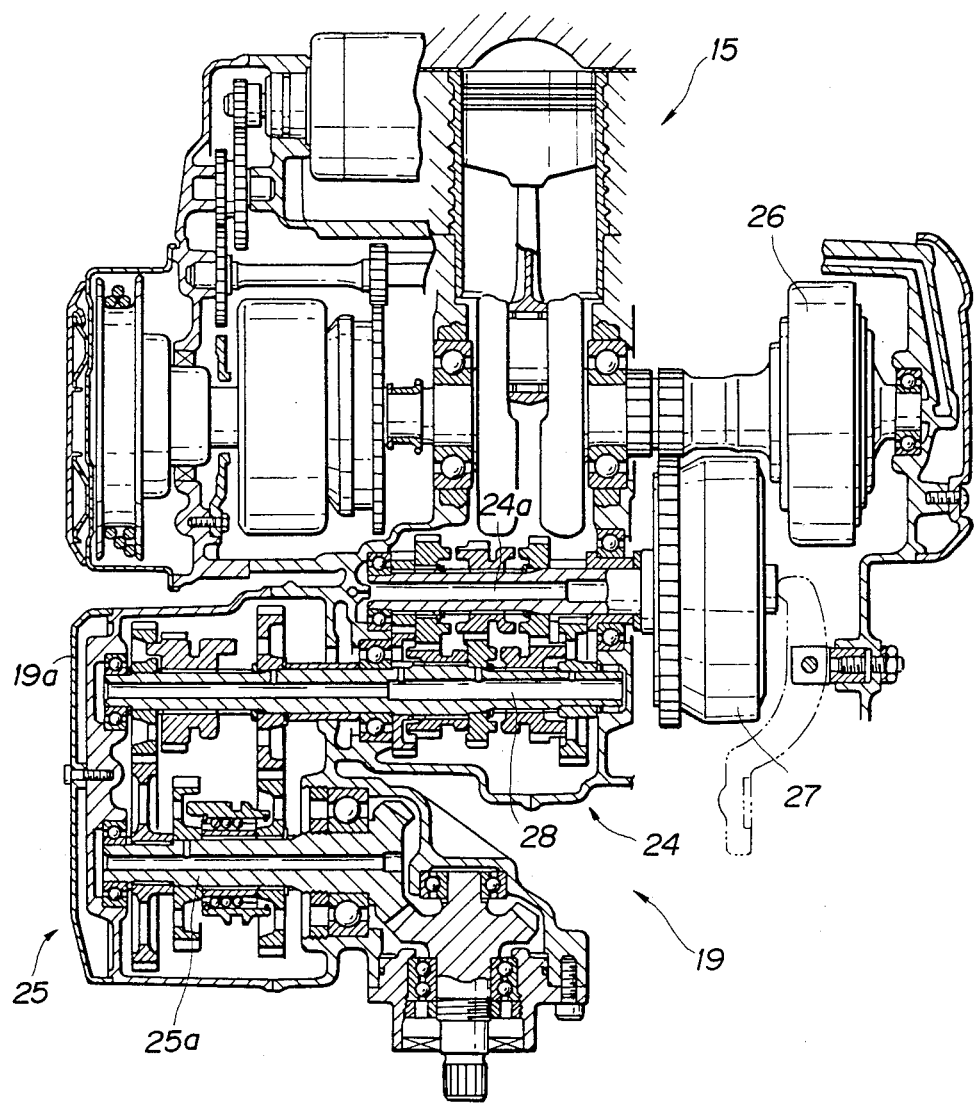
FIG. 2 is a horizontal cross-sectional view of the transmission of the present invention.
Figure 3:
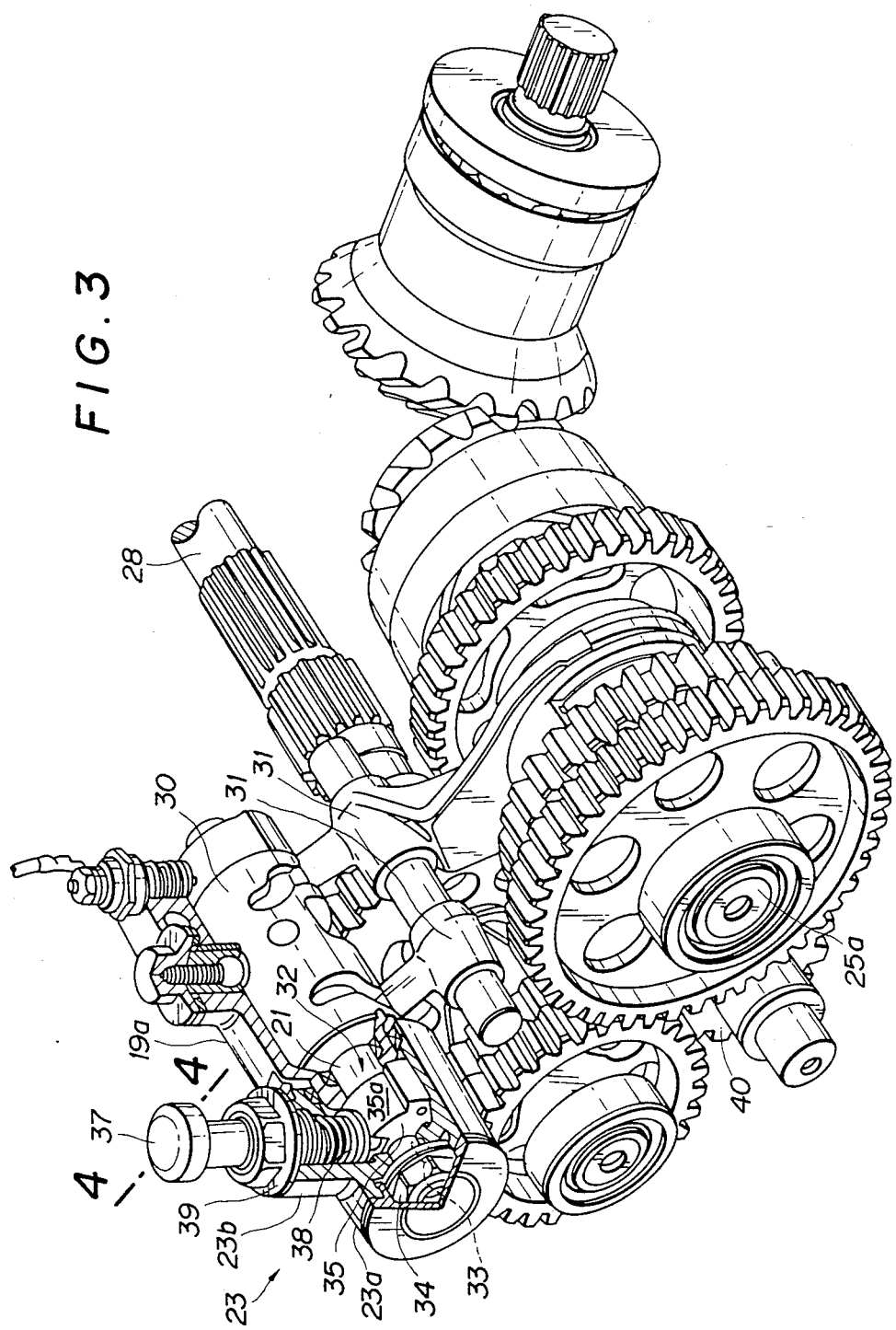
FIG. 3 is a perspective view, partly broken away, of a part of the transmission.

As shown in FIG. 2, the primary transmission mechanism 24 has five gear trains having mutually different gear ratios. Therefore, the primary transmission mechanism can select five-speed gear positions, and the shifting mechanism for the primary transmission mechanism has six gear positions including a neutral gear position. The direction of the rotation of the common shaft 28 acting as the counter shaft remains the same in any of the gear positions.

The secondary transmission mechanism 25 has three gear trains one of which is used in a reverse gear position. The secondary transmission mechanism 25 has a reverse idler gear 40 (FIG. 3) for rotating the counter shaft 25a in a direction opposite to the direction in which it is rotated when the other gear trains than the gear train for the reverse gear position are used. The shifting mechanism for the secondary transmission mechanism has three gear positions, that is, a forward high-speed gear position, a forward low-speed gear position, and a reverse gear position.

The first control lever 22 which is operated by the driver's foot is coupled through the first shift spindle 20 to the shifting mechanism for the primary transmission mechanism. The second control lever 23 which is operated by the driver's hand is coupled through the second shift spindle 21 to the shifting mechanism for the secondary transmission mechanism.

Figure 4:
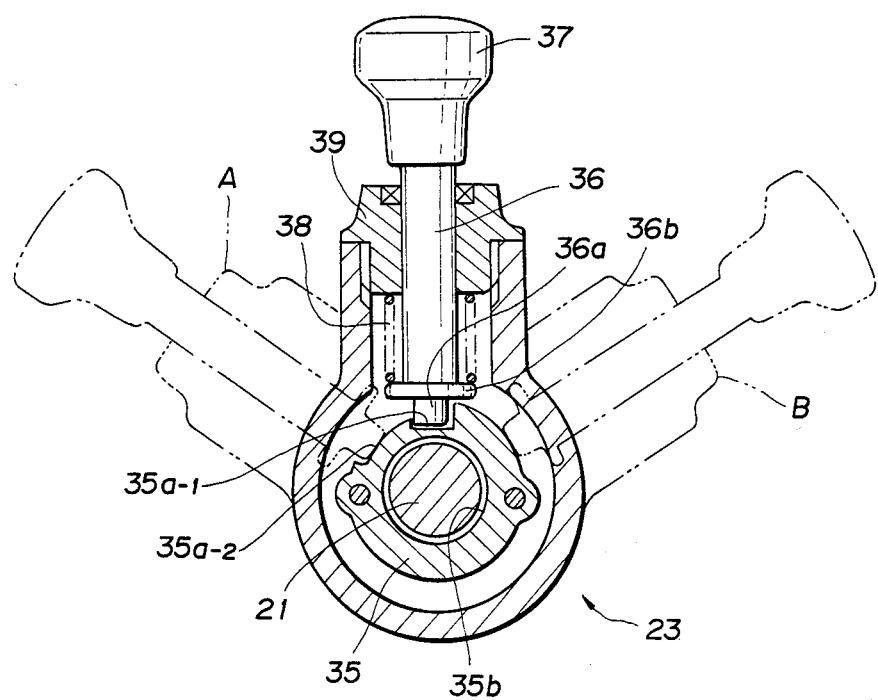
FIG. 4 is a vertical cross-sectional view taken along a plane containing line 4—4 of FIG. 3, the view showing a cam means.

According to the present invention, a cam mechanism 32 capable of limiting shifting operation of the second control lever (hereinafter referred to as a "control lever") 23 is interposed between the control lever 23 and the transmission casing 19a. As shown in FIGS. 3 and 4, the control lever 23 is composed of a base 23a in the form of a hollow cylinder coaxial with the shift spindle 21, and a tubular arm 23b extending radially outwardly from the base 23a. The control lever 23 is fixed at an end of the base 23a remote from the casing 19a to an outer end of the shift spindle 21 by a key 33 and a nut 34. When the low-speed gear position is selected, the control lever 23 is in an erect position indicated by the solid line in FIG. 4. When the high-speed gear position and the reverse gear position are selected, the control lever 23 is in front and rear tilted positions A, B, respectively.

The cam mechanism 32 comprises a cam member 35 fixed to the casing 19a and having a cam surface 35a, a shaft member 36 axially slidably fitted in the arm 23b of the control lever 23 and having a control knob 37 on a first (upper) end, and a spring 38 interposed between the shaft member 36 and the control lever 23 for urging the shaft member 36 to force a second (lower) end of the shaft member 36 to abut against the cam surface 35a of the cam member 35.

The cam member 35 is of a substantially cylindrical configuration having a central axial hole 35b and fixed at one end to the casing 19a. The cam surface 35a is defined on an upper half of the outer peripheral surface of the cam member 35. The shift spindle 21 extends through the axial hole 35b in the cam member 35 and projects out of an outer end of the cam member 35. The cam member 35 is surrounded in its entirety by the base 23a of the control lever 23.

A projection 36a and a flange 36b are formed on the second end of the shaft member 36. The shaft member 36 is inserted through a hole in a sleeve 39 attached to the arm 23b of the control lever 23. The spring 38 is placed under compression between a bottom of the sleeve 39 and the flange 36b of the shaft member 36 for urging the shaft member 36 toward the cam member 35.

As illustrated in FIG. 4, the cam surface of the cam member 35 has a relatively deep, first recess 35a-1 defined centrally in an upper side surface of the cam member 35 and a relatively shallow, second recess 35a-2 defined in front of the first recess 35a-1.

Operation of the above construction is as follows:

When the control lever 23 for the secondary transmission mechanism is in the low-speed gear position, the projection 36a on the second end of the shaft member 36 engages in the first recess 35a-1 of the cam surface 35a as indicated by the solid line in FIG. 4. In this position, the control lever remains positionally unchanged even when it is subjected to a force tending to rotate the shift spindle 21. The secondary transmission mechanism is normally put in the low-speed gear position when the motor vehicle runs on relatively hard off-road terrain, and during that time the control lever tends to be subjected to an accidental undue force. However, the above arrangement of the invention holds the control lever reliably in the low-speed gear position without fail.

When shifting the control lever from the high-speed gear position to the low-speed gear position, a rearward force is applied to the control lever, which is initially in the front position A shown by the imaginary lines in FIG. 4, to move the control lever toward the low-speed gear position. When the control lever reaches the low-speed gear position, the projection 36a of the shaft member 36 engages a rear sidewall of the first recess 35a-1, which then prevents the control lever from going toward the rear position shown by the imaginary line B in FIG. 4. While the motor vehicle is running on rough terrain, there are instances in which the motor vehicle needs a large torque suddenly, and in such cases the control lever has to be shifted quickly from the high-speed gear position to the low-speed gear position. At this time, the cam surface configuration illustrated in FIG. 4 allows the control lever to be shifted reliably into the low-speed gear position while preventing the control lever from going on beyond the low-speed gear position, no matter how quickly the control lever may be shifted.

For moving the control lever to another gear position, it is necessary to lift the knob 37 of the shaft member 36 and then turn the control lever. Such a shifting operation however is not required to be done quickly, but should be carried out rather slowly. Accordingly, the lift-and-then-turn shifting operation does not cause any substantial inconvenience on the part of the driver. Rather, the arrangement of the present invention makes the shifting operation of the transmission more reliable and convenient.

The cam surface may be varied as desired dependent on the type of the vehicle in which the transmission is incorporated, as well as the gear position arrangement of the transmission. Therefore, the present invention is applicable to various motor vehicle transmissions other than illustrated above.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A motor vehicle transmission comprising a casing, a shift spindle having one end thereof projecting from said casing and being rotatable for causing shifting of said transmission, a control lever coupled to said shift spindle for rotatably actuating said shift spindle, and means for limiting shifting operation of said control lever said shift limiting means comprising:

a cam means fixed to said casing about said shift spindle and formed with a peripheral cam surface having a plurality of cam areas, said cam areas comprising at least one recess area;

said control lever being formed with a base portion surrounding said cam means and an arm portion extending radially outwardly from said base portion;

a shaft member axially slidably fitted in said arm portion; and spring means urging one end of said shaft member against said peripheral cam surface of said cam means, whereby when said control lever is shifted to a position where said one end of said shaft member rests on said recess area of said cam surface it will remain in that position and cannot be accidentally removed therefrom when subjected to undue force.

2. A transmission according to claim 1, wherein said cam member is substantially cylindrical in shape and has a central axial hole defined therein and fixed at one end to said casing, said cam surface being defined on an outer peripheral surface of said cam member, said shift spindle extending through said axial hole in said cam member.

3. A transmission according to claim 2, wherein said base portion of said control lever is in the form of a hollow cylinder coaxial with said shift spindle, said arm portion is tubular, and said shaft member being fitted in said tubular arm portion of said control lever.

4. A motor vehicle transmission as recited in claim 1 wherein said plurality of cam areas includes a plurality of recess areas in said peripheral cam surface, said areas being formed at different depths, whereby said control lever may easily be shifted to move from a position to another position where said one end of said shaft member will rest on a recess area of greater depth.

5. A motor vehicle transmission as recited in claim 4 wherein said shaft member further includes a knob on an end thereof extending radially outward from said arm portion, whereby said shaft member may be moved outwardly by lifting said knob outwardly to lift said one end from a recess area in order to shift said control lever to another position where said one end of said shaft member will rest on a cam surface area of lesser depth.

6. A motor vehicle transmission as recited in claim 5, wherein said cam areas include a relatively deep first recess area and a relatively shallow second recess area adjacent thereto, and said control lever may easily be moved to position where said one end of said shaft member rests on said first recess area and can only be removed therefrom by lifting said knob outwardly.

* * * * *

UNITED STATES PATENT AND TRADEMARK OFFICE
CERTIFICATE OF CORRECTION

PATENT NO. : 4,574,652

DATED : March 11, 1986

INVENTOR(S) : Takashi Shichinohe, et al

It is certified that error appears in the above-identified patent and that said Letters Patent is hereby corrected as shown below:

On the title page:

Item [22] Filed: reading "Aug. 9, 1984" should read --Aug. 8, 1984--.

Signed and Sealed this

Twentieth Day of May 1986

[SEAL]

Attest:

Attesting Officer

DONALD J. QUIGG

Commissioner of Patents and Trademarks